United States Patent [19]

den Toonder

[11] 4,039,954
[45] Aug. 2, 1977

[54] SIGNAL DISTRIBUTION DEVICE FOR A CABLE TELEVISION

[75] Inventor: Pieter den Toonder, Dordrecht, Netherlands

[73] Assignee: Oak Holland B.V., Emmen, Netherlands

[21] Appl. No.: 581,139

[22] Filed: May 27, 1975

[51] Int. Cl.² .............................................. H04B 1/06
[52] U.S. Cl. .................................... 325/308; 325/132; 358/122
[58] Field of Search ............................ 178/DIG. 13, 5.1; 325/308, 132, 32, 34; 179/15 BD; 358/114, 122

[56] References Cited

U.S. PATENT DOCUMENTS

| 3,668,307 | 6/1972 | Face | 325/308 |
| 3,786,424 | 1/1974 | McVoy et al. | 178/DIG. 13 |
| 3,806,814 | 4/1974 | Forbes | 178/DIG. 13 |
| 3,896,262 | 7/1975 | Hudspeth | 325/132 |
| 3,899,633 | 8/1975 | Sorenson | 325/31 |
| 3,899,633 | 8/1975 | Sorenson et al. | 178/DIG. 13 |

FOREIGN PATENT DOCUMENTS 1,030,841  5/1966  United Kingdom ........ 178/DIG. 13

Primary Examiner—Benedict V. Safourek
Assistant Examiner—Michael A. Masinick
Attorney, Agent, or Firm—Kinzer, Plyer, Dorn & McEachran

[57] ABSTRACT

A cable television signal distribution system provides a plurality of television programs and radio programs which are transmitted in frequency multiplex to a plurality of subscriber drop lines. A data receiver and logic control unit, after decoding suitable supplied codes, control the operation of a plurality of high frequency switches by which the received programs can be switched and/or jammed from a remote locate to selectively provide subscribers the desired program.

9 Claims, 8 Drawing Figures

SIGNAL DISTRIBUTION DEVICE FOR A CABLE TELEVISION

The invention relates to a signal distribution device for a cable television network having a supply line, by which a plurality of television programs and radio programs are transmitted in frequency multiplex to a plurality of subscriber drop lines. Such a signal distribution device is known in practice.

In the known cable television networks subscribers are usually connected with the aid of signal distribution devices to a supply or ring line distributing in frequency-multiplex a plurality of television programs and radio programs to the relevant subscribers. A certain number of subscribers in such a system is connected to each distribution device.

A disadvantage connected with said system, is that during the installation of said cable television network only those subscribers can be connected to the distribution devices, who previously have indicated that they wanted to be connected to the system. Upon a later subscription a technician has to connect the residence of said subscriber to a related distribution device which is costly and time-consuming. Upon both a termination and a non-payment a technician has also to disconnect the subscriber from the distribution device.

With the system indicated in the introduction it is therefore not always possible to deny already connected subscribers the reception of certain programs.

It is an object of the invention to supply a signal distribution device, whereby already during the installation of the television network each residence is connected to the distribution device, such that by implementation of remote control with a suitable code each subscriber from a central location can be connected at each desired moment to the cable television network or can be disconnected from said network.

It is also an object of the invention to allow the implementation of said remote control with a suitable code such that certain programs on certain subscriber drop lines can be jammed so that observation and listening of the related program is made impossible.

A signal distribution device according to the invention is characterized by one or a plurality of high-frequency switches by which said programs can be remotely switched and/or jammed, of which switches for each subscriber line one is inserted in series and/or a plurality is taken up in co-operation with this line; a data receiver and a logic control unit which after decoding of the suitable codes switches the series switch(es) for tansmission of the high-frequency program signals and/or the switch(es) cooperating with the line(s) for jamming of certain high-frequency signals.

The distinct advantage in said system is that each subscriber connected to the distribution device, can be connected or disconnected from a central location and also that each subscriber can be allowed or can be denied the reception of certain programs without jamming of the other subscribers.

An additional advantage is also that a subscriber is not able to switch on himself. The invention will be explained with the aid of an embodiment with reference to the drawings, in which:

FIG. 3b is a drawing of the portion relative to the high-frequency operation of the high-frequency switch according to FIG. 3a;

Figure 1:
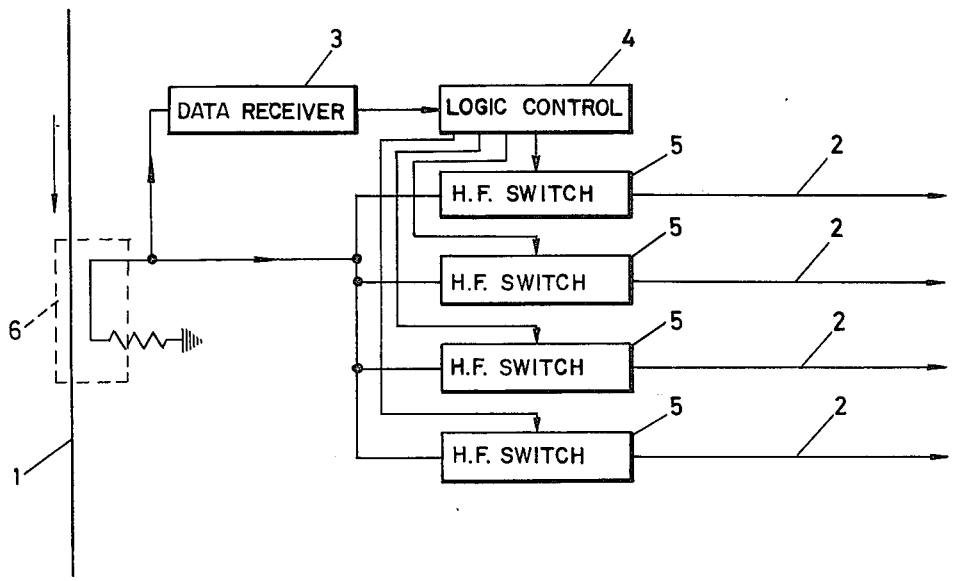
FIG. 1 is a block diagram of a signal distribution device including four subscriber drop lines, whereby in each line a high-frequency switch is inserted in series and whereby the transmission and the disconnection respectively of the programs can be switched remotely.

Referring to FIG. 1, there is shown a supply or ring line 1, a plurality of subscriber drop lines 2, a data receiver 3, a logic control unit 4, high-frequency switches 5 and a braching element 6. The data receiver 3 in said distribution device is connected to the branching- or coupling distribution point. For said branching function a directional coupler or a tap can be used. The logic control unit following the data receiver, decodes the suitable codes introduced in the high-frequency signal. Depending upon the information of said codes the control unit 4 will switch one or a plurality of high-frequency switches 5 such that the high-frequency signals of the related television programs and radio programs are transmitted to the subscriber lines 2 or are blocked from transmission.

Figure 2:
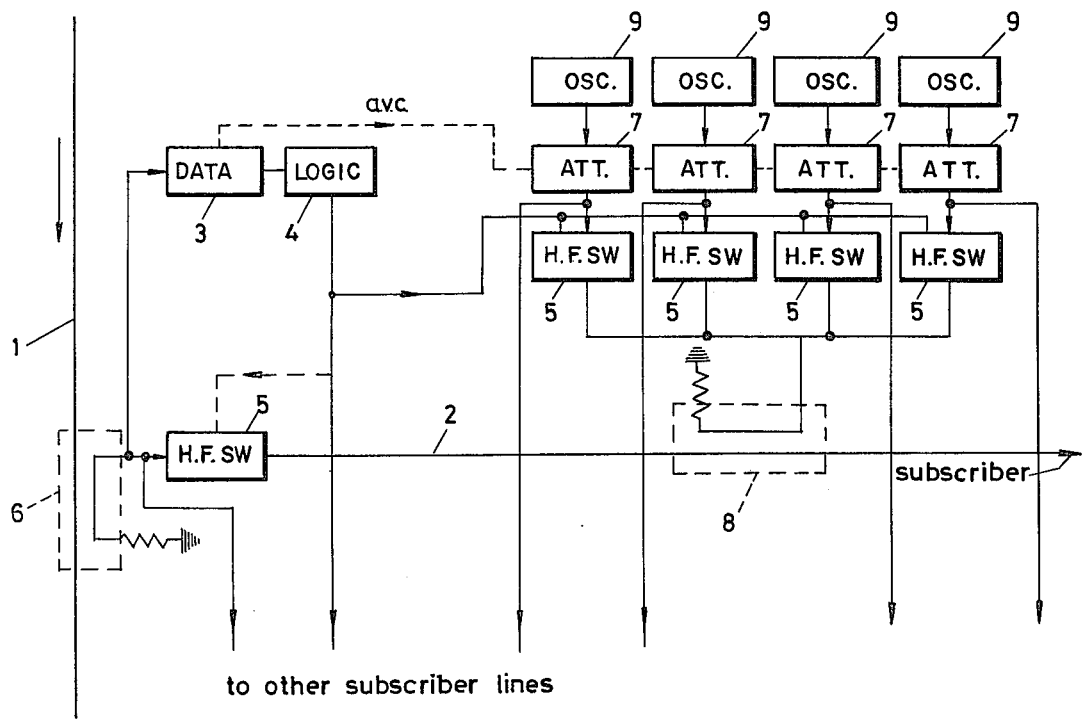
FIG. 2 is a block diagram of a signal distribution device including a single subscriber drop line, provided with four high-frequency switches co-operating in parallel with the line for jamming at wish of certain television programs and radio programs.

Referring to FIG. 2, a block diagram is indicated of a signal distribution device by which it is feasible to couple jamming signals into the subscriber drop lines by which the related subscribers can be allowed or can be denied the reception of television programs and radio programs. Again referring to FIG. 2, there is indicated a supply line 1, a single subscriber drop line 2, a data receiver 3 connected to the branching distribution point, a logic control unit 4, a single high-frequency switch inserted on series with the subscriber line 2. Also there is shown a plurality of high-frquency switches 5 taken up in parallel with the subscriber line 2, a plurality of preconnected oscillators 9 and a plurality of attenuators 7 connected in between.

The oscillators 9 substantially have the same frequency as the related programs, such that upon a closed switch 5 a strong interference signal is introduced in the subscriber line to thereby interdict the observation and listening of the program. As the signal is coupled into the subscriber line, for these jamming signals low levels, for example about O dBmV, can be used. These jamming levels can be maintained with the aid of for example a pin-diode attenuator, which is controlled by the automatic gain control of the data receiver. In order to prevent leakage into the system, the oscillator signals are introduced via a directional coupler 8 into the subscriber line.

Figure 3A:
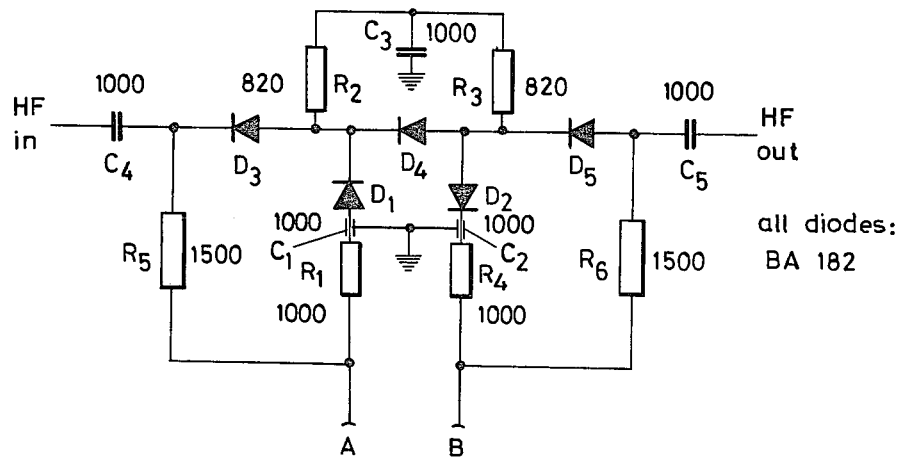
FIG. 3a is a drawing of an embodiment of a high-frequency switch of the semi-conductive type, which is used in the device according to FIG. 2.
Figure 3B:
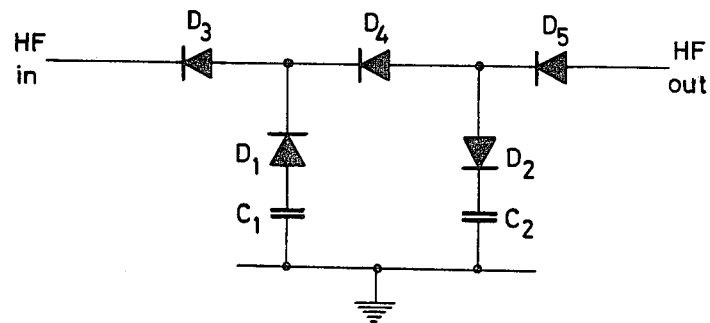

With reference to FIG. 3a, there is shown a high-frequency switch of the semi-conductive or solid-state type. The attenuation of this switch in the 50–300 MHz-region is better than 88 dB. The applied power is 2 mA for 5 V direct current. The operation is as follows:

If point A is positive with respect to point B, there will follow a direct current in the circuit $R_1$, $D_1$, $R_2$, $R_3$, $D_2$, $R_4$, by which the series diodes $D_3$, $D_4$ and $D_5$ are connected in reverse direction and the parallel diodes $D_1$ and $D_2$ are connected in forward direction. With reference to FIG. 3b, there is indicated with respect to the high-frequency operation how the assembly constitutes an attenuator comprising large series-impedances ($D_3$, $D_4$ and $D_5$) and small parallel-impedances ($D_1$ with $C_1$ and $D_2$ with $C_2$), such that the high-frequency signal is not transmitted from the input to the output (and also not vice versa).

If point A is negative with respect to point B, there will follow a direct current in the circuit $R_6$, $D_5$, $D_4$, $D_3$, $R_5$, by which the series diodes $D_3$, $D_4$ and $D_5$ are connected in forward direction and the parallel diodes $D_1$ and $D_2$ are connected in reverse direction. The high-frequency signal now is transmitted practically without attenuation. The capacitors $C_3$ and $C_5$ serve to block the DC voltage applied to the points A and B, to the high-frequency cables.

The capacitor $C_3$ is used in order to prevent the occurrence of a high-frequency leakage via $R_2$ and $R_3$ parallel to $D_4$ (in reverse direction). All resistors serve to set the DC bias and they do not have a high-frequency function.

The high-frequency switch can also be of the mechanical type.

For four subscribers for a branching point by way of example the following is requires:

- one data receiver;
- one logic unit including for the
  branching address: n bits
  subscriber address: 2 bits
  connect/disconnect: 1 bit
  four programs: 4 bits
- four oscillators and corresponding attenuators;
- four subscriber units each including five high-frequency switches.

In principle, any number of subscribers and a number of programs per unit can be combined.

Figure 4:
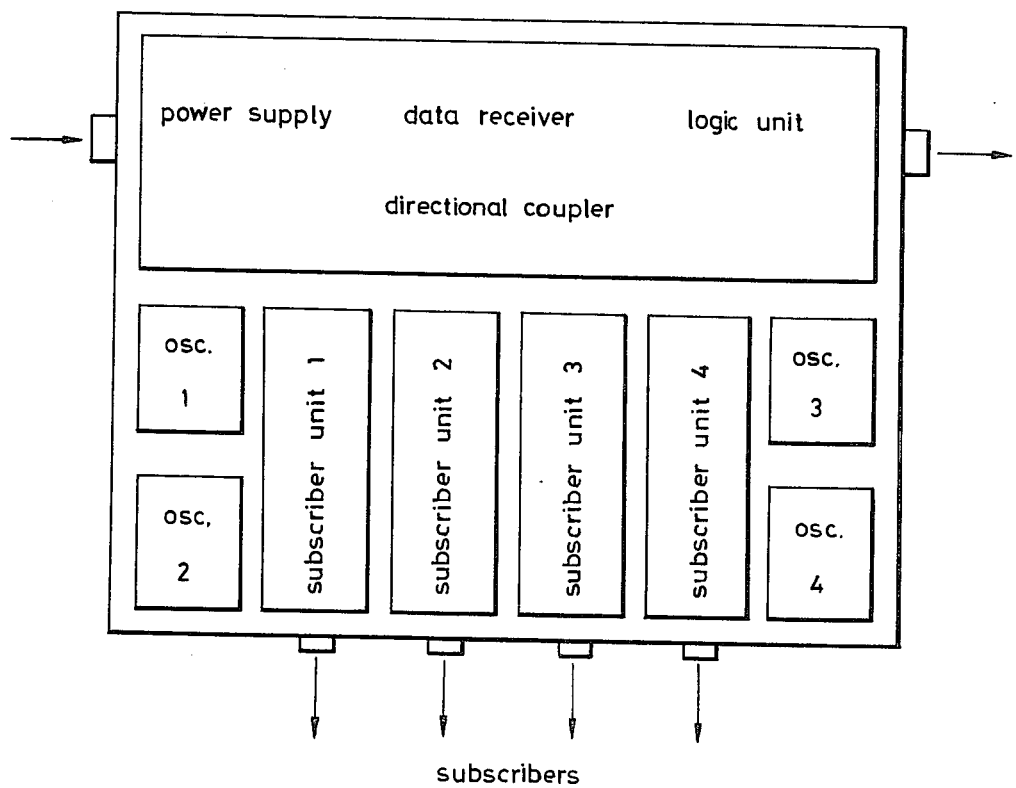
FIG. 4 is a front view of a housing in which the distribution device is taken up

Referrring to FIG. 4 there is indicated how such a combination can be inserted in a formed housing.

Figure 5:
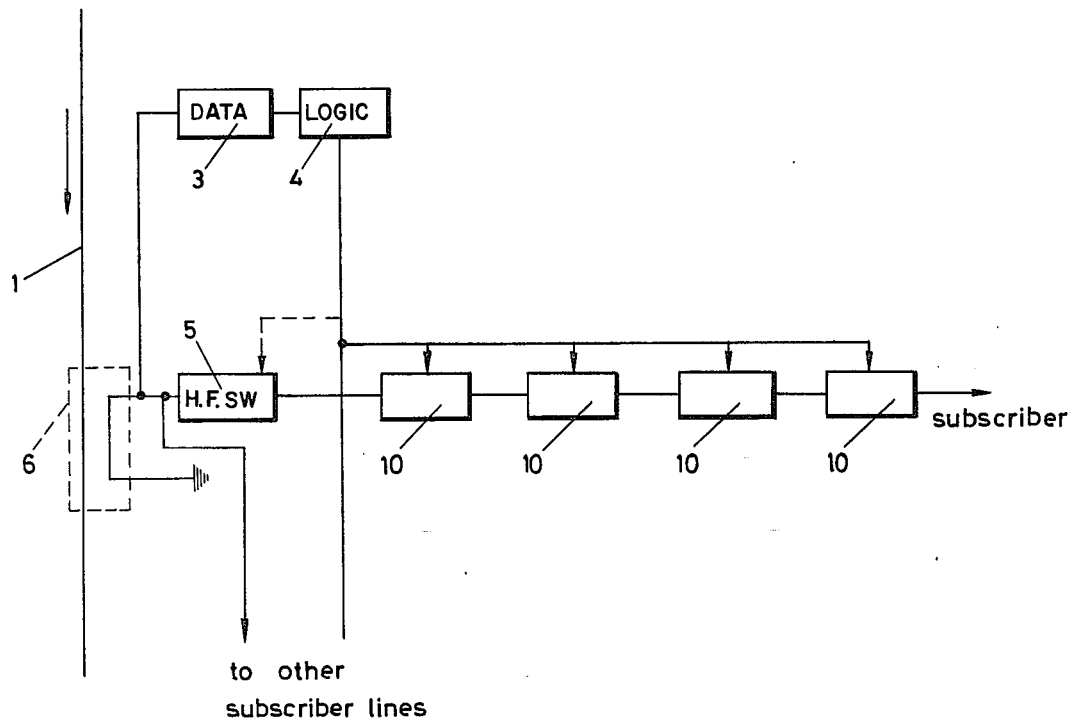
FIG. 5 is a block diagram of a signal distribution device including a single subscriber drop line provided with four high-frequency switches of another type inserted in series with the line for jamming at wish of certain television programs and radio programs.

Referring to FIG. 5, there is indicated a block diagram of a signal distribution device, with which it is possible as with the device according to FIG. 2, to allow and to deny respectively the subscriber the reception of four or more or less programs respectively. The same componencts in FIG. 4 as those according to FIG. 2 are indicated by the same reference numbers. Instead of four high-frequency switches 5 in parallel with the subscriber line, however, four high-frequency switches 10 of another type are inserted in series with the line.

Figure 6:
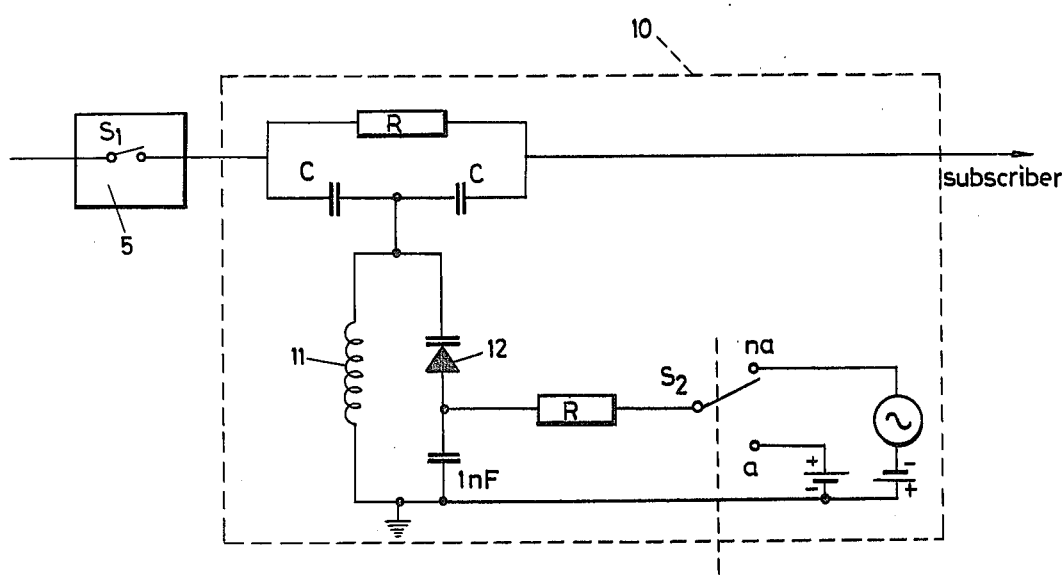
FIG. 6 is a drawing of an embodiment of a high-frequency switch of said other type, which is used in the device according to FIG. 5.

Referring to FIG. 6, there is indicated a drawing of the high-frequency switch 10 of the other type. Before this switches of said other type the high-frequency switch 5 ($S_1$) can be inserted in series for the transmisson of blocking respectively of all high-frequency program signals per subscriber. In the switch 10 a T-filter is inserted in series with the subscriber line, and a parallel circuit of an inductance 11 and among others a Varicap 12 is inserted in the cross branch of the T-filter. By periodically controlling said Varicap 12 with for example a low-frequency signal of 50 or 1000 Hz, the tuning of the circuit can be swept across the whole channel or a portion thereof, such that periodically (not synchronously) always another, relatively small portion of the side bands of the signal is filtered out so that the resulting signal is jammed. The tuning of this high-frequency switch or trapping circuit is obtained in the position "na" (not authorized) of the switch $S_2$ by adjusting the inudctance 11 on the channel to be jammed. Care should be taken during this procedure that adjacent program channels are not disturbed a bit either. By placing the switch $S_2$ under control of the control unit 4 from the position na to the position "a" (authorized), the jamming of the related program channel is removed. The switch $S_2$ only switches low frequencies and therefore can be both of the mechanical type and of the solid-state type.

As the Varicap diode is switched in forward direction in the position a, a current from the DC-voltage source flows via $S_2$, the resistor R, the Varicap 12 and the inductance 11 back to the source. The inductance is short-circuited and the two capacitors C having relatively small values, occur in parallel with the line and then have practically no influence on the signal transmission.

It is also feasible to simultaneously jam a plurality of channels being adjacent to each other, by selecting the low frequencies sweep to be large enough. In this case one switch 10 for a plurality of channels is sufficient.

Figure 7:
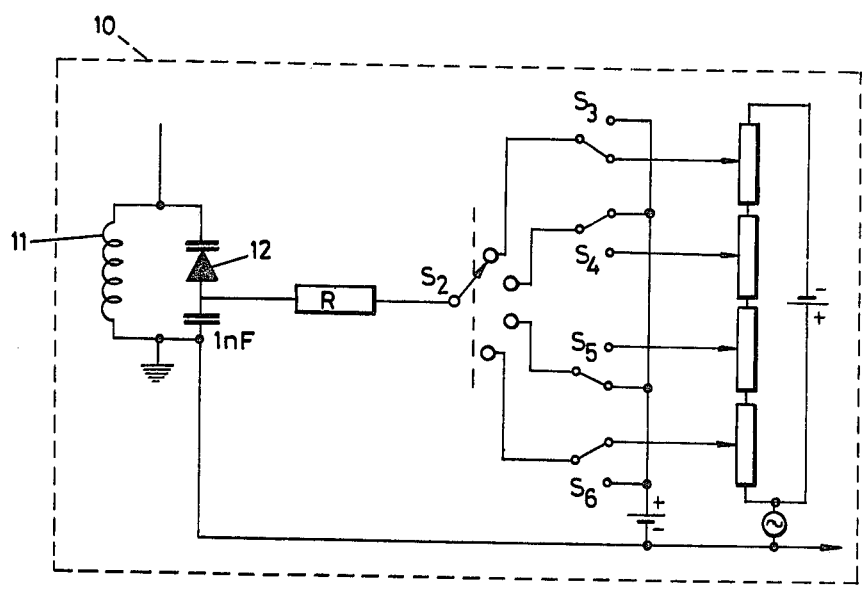
FIG. 7 is a drawing of another embodiment of a high-frequency switch of said other type which singularly can be used for a plurality of channels.

Referring to FIG. 7 there is indicated how the switch 10 for example can be tuned on four different channels by periodically connecting this switch via a solid-state switch ($S_2$ and $S_3$–$S_6$) to different negative voltages by which a plurality of channels is subsequently jammed. The switch $S_2$ can periodically (for examples 3 $\mu$ sec) be connected through. Of the switches $S_3$–$S_6$ for four programming channels each of them under control of the control unit 4 can be adjusted to a positive DC voltage only (no jamming) or to the low-frequency voltage superimposed upon a negative DC-voltage.

The tuning is then determined by the DC voltage on the varicap and the trapping circuit is swept with the 50 or 1000 Hz voltage across the related channel. By connecting or disconnecting said low-frequency voltages with the aid of the data receiver and the control unit, program after program can be allowed or denied respectively. Each channel which is denied, can be sufficiently jammed in this way by the correct selection of the repetition frequency.

In order to jam a plurality of channels a parallel connection, besides the first mentioned series connection and the above mentioned plural connections can also be used, namely by inserting in the longitudinal branch of the T-filter a plurality of trapping circuits parallel to each other.

I claim:

1. A signal distribution means for use with a cable television network having a supply line in which a plurality of TV programs are transmitted in frequency multiplex to a plurality of subscriber drop lines, said means including a data receiver connected to the supply line, a logic control unit connected to said data receiver, a plurality of high frequency switches controlled by said logic control unit, and a jamming oscillator connected to each high frequency switch, said high frequency switches responding to control signals from said data receiver and logic control unit to provide jamming signals from designated oscillators to said subscriber drop lines to prevent clear reception of designated TV programs.

2. The means of claim 1 further characterized by and including attenuation means connected between each oscillator and its associated high frequency switch.

3. The means of claim 1 further characterized in that each high frequency switch includes three unidirectionally connected diodes, the junctions on each side of the center diode being connected to ground by the series combination of a diode and capacitor.

4. The means of claim 3 further characterized in that the cathode of one series diode is connected to the cathode of the center diode with the anode of the other series diode being connected to the anode of the center diode.

5. The means of claim 4 further characterized by and including capacitors connected to the cathode of the first of said three unidirectionally directed diodes and to the anode of the third of said three unidirectionally connected diodes.

6. The means of claim 5 further characterized by and including a series resistive circuit shunting said center diode.

7. Signal distribution means for use with a cable television network having a supply line on which a plurality of TV programs are transmitted in frequency multiplex to a plurality of subscriber drop lines, said means including a connection from the supply line to each subscriber, a data receiver connected to the supply line, a logic control unit connected to said data receiver, and a plurality of high frequency switches controlled by said logic control unit, each high frequency switch including a low frequency oscillator for variably tuning said high frequency switch, said high frequency switches responding to control signals from said data receiver and logic control unit to prevent clear reception of designated programs.

8. The means of claim 7 further characterized by and including a jamming oscillator connected in series with each high frequency switch.

9. The means of claim 7 further characterized in that each high frequency switch includes a parallel circuit of an inductance and a variable capacitance, said low frequency oscillator being connected to said variable capacitance.

* * * * *